(12) United States Patent
LaDuke

(10) Patent No.: US 8,388,139 B2
(45) Date of Patent: *Mar. 5, 2013

(54) INTERACTIVE PROJECTED SANDBOX

(75) Inventor: Thomas Fraiser LaDuke, Orange, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/367,922

(22) Filed: Feb. 7, 2012

(65) Prior Publication Data

US 2012/0133911 A1    May 31, 2012

Related U.S. Application Data

(63) Continuation of application No. 12/504,836, filed on Jul. 17, 2009, now Pat. No. 8,136,949.

(51) Int. Cl.
*G03B 21/14* (2006.01)

(52) U.S. Cl. .......................... 353/28; 353/121

(58) Field of Classification Search .............. 353/28
See application file for complete search history.

(56) References Cited

U.S. PATENT DOCUMENTS

| 3,707,115 | A | 12/1972 | Rush |
| 4,951,151 | A | 8/1990 | Sorenson et al. |
| 5,954,517 | A | 9/1999 | Hagenlocher |
| 7,654,826 | B2 | 2/2010 | Faulkner et al. |

*Primary Examiner* — William C Dowling
(74) *Attorney, Agent, or Firm* — Marsh Fischmann & Breyfogle, LLP; Kent A. Lembke

(57) ABSTRACT

A method for creating an interactive display in which users/players can form the projection screen. The method includes providing granular display material, such as a layer of sand in a container, and storing a guide image and a display image in memory of a control system. Then, a projector is first operated to project the guide image on an upper surface of the display material. After a sculpting period or in response to a user or operator provided trigger, the method includes second operating the projector to project the display image on the upper surface which has been sculpted by the user into a 3D projection surface or screen during the first operating step. The projected guide image may include an outline of an object, and the display image may include an image element that is mapped to the location of the outlined object.

23 Claims, 9 Drawing Sheets

INTERACTIVE PROJECTED SANDBOX

RELATED APPLICATIONS

This application is a continuation of U.S. patent application Ser. No. 12/504,836, filed Jul. 17, 2009, entitled "INTERACTIVE PROJECTED SANDBOX," which is hereby incorporated by reference into this application.

BACKGROUND OF THE INVENTION

1. Field of the Invention

The present invention relates, in general, to projection methods and systems, and, more particularly, to systems, devices, and methods for projecting media such as a still image or a video clip/segment upon a projection screen that is tangible, e.g., a two-dimensional (2D) projection screen or surface formed of materials that a user may readily mold, sculpt, or modify in shape to form a new 3D projection screen or surface, so as to create an interactive entertainment experience.

2. Relevant Background

There is a growing demand for entertainment and experiences that involve interactivity. For example, in the video game industry, video games are rapidly being developed that provide more tactile feedback to the game player through a game controller. Recently, game systems have become intelligent enough to sense location and amount of movement of the controller such that the player may interact more fully with the video game such as by playing tennis, by bowling, by dancing, or by exercising. Each of these activities may include moving one or more controllers or stepping upon a sensor pad with the game system tracking or determining how the user or player is interacting with the game. Tactile sensations are also popular in music based games where the players simulate playing a guitar or a set of drums.

Similarly, interactivity is provided in other products through touch screens and similar tactile interface devices. For example, many video games allow the user to interact by pressing locations on a touch screen in response to displayed images. Game players and other consumers continue to demand more interactivity, and touch screens have even been incorporated into small electronic devices such as cellular or wireless phones so that users are able to interact more directly with displayed images rather than indirectly via a keyboard. Consumers appear to enjoy products and experiences where they not only can view images such as watch a movie or view images, but they also seem to enjoy experiences more thoroughly when they are able to interact with the images and/or receive tactile feedback.

SUMMARY OF THE INVENTION

The present description provides systems and methods for providing an interactive display experience in which a user or player is able to create a three-dimensional (3D) projection surface or screen that is then brought to life or animated with a color still or motion image. Briefly, the system may include a container filled with a volume or layer of granular or particulate material such as sand and a projector focused upon a surface of the material ("granular display material"). A control system is provided that functions to selectively operate the projector and that includes memory storing one or more guide or template images mapped to the size and shape of a projection area or surface of the display material. Each of the guide images includes one or more outlines of objects (e.g., a castle outer wall, an outline of a character/animal, and so on) along, in some cases, with an instructional message (e.g., "move sand from here" "to here" or the like). The memory also stores a display image that includes images or image elements mapped to the locations of the outlined objects in the guide images. The guide images are projected by the control system using the projector upon the base surface (e.g., 2D or generally flat initial surface of the sand/display material in the container) to urge or instruct a user/player to sculpt the objects with the granular material to form a 3D projection surface, and then the control system operates to use the projector to project the display images with its color image elements upon the sculpted objects or surfaces to create a 3D color display experience.

More particularly, a method is provided for creating an interactive display in which users/players can form the projection screen. The method includes providing a volume of granular display material such as sand in a layer at least 0.5 inches deep and, more typically, at least about 2.5 inches. The method includes storing a guide image and a display image in memory of a control or computer system. Then, a projector is operated by the control system to project the guide image on an upper surface or predefined area on the display material. After a sculpting period or in response to a user or operator provided trigger, the method includes operating the projector with the control system to project the display image on the upper surface (e.g., the 3D projection surface/screen) that has been shaped or sculpted by the user during the first operating step.

The projected guide image may include an outline of an object and the display image may include an image element that is mapped to the location of the outlined object, such that a location of the image element on the 3D projection surface at least partially overlaps with a location of the outlined object. The method may include, after the projecting of the first guide image, sequentially projecting additional guide images with differing outlined objects that correspond to recessed or raised image elements in the later projected display image. The display image may include a colored still image (e.g., a photograph or animated frame) with a set of image elements that are mapped to a corresponding set of 3D projection surface components provided/outlined in the guide image. The projected guide image may include outlines of a set of projection objects and the projected display image may include a projected video stream with moving images that are mapped to the locations (e.g., X-Y coordinates) of the projection objects in the guide image, whereby a user/player is guided to sculpt the projection objects in the display material to form a 3D projection surface on which the moving image can be displayed for a 3D display experience.

DETAILED DESCRIPTION OF THE PREFERRED EMBODIMENTS

The following description is directed toward methods and systems for providing an interactive projection or display experience. Briefly, a player or user is guided or instructed to sculpt or shape (e.g., interact) a three-dimensional (3D) projection surface or screen from a generally two-dimensional (2D) beginning surface of projection or display material (e.g., playground sand or the like). The guided experience may be likened to paint-by-the numbers in which a framework or outer borders for objects to be sculpted or formed as 3D objects/projection surfaces are displayed on the tangible display material, with some embodiments providing a scripted set of instruction/guide images that are projected on the in-progress 3D projection surface to encourage the player/user to build the objects/projection surfaces (e.g., move sand/material from one location to another location with borders/frameworks used to define dig/removal areas and build/apply areas or objects).

A control system then acts to operate a projector(s) to project still or video images that have been previously selected so as to map to the user-constructed or shaped 3D projection surface. The described methods and systems provide a simple organic interface between the user and the projected images or display experience, and the user's learning curve for this experience is quite flat or low as nearly everyone has played in the sand and/or used paint-by-number sets in their lifetimes. The interactive display systems may be provided using common, off-the-shelf video projection technology that are combined with an interactive projection screen formed of a tangible and readily shaped material such as sand. For example, a pre-defined sandbox or sandpit experience may be constructed that may include a container with a particular shape and size that is filled with a layer of sand or other material that the player/user may interact with to form a 3D projection surface. The container may take on the appearance of a classic child sandbox, but the space is illuminated with video projection or projected media. The projector is typically located above the sandbox or display material container, and the projected video is mapped to the shape and size of the sandbox as well as having its included images being mapped to the location, size, and shape of projection surfaces/objects that are formed/sculpted by the player/user when they interact with the display material (e.g., layer of sand) to form the 3D projection surface.

Figure 1:
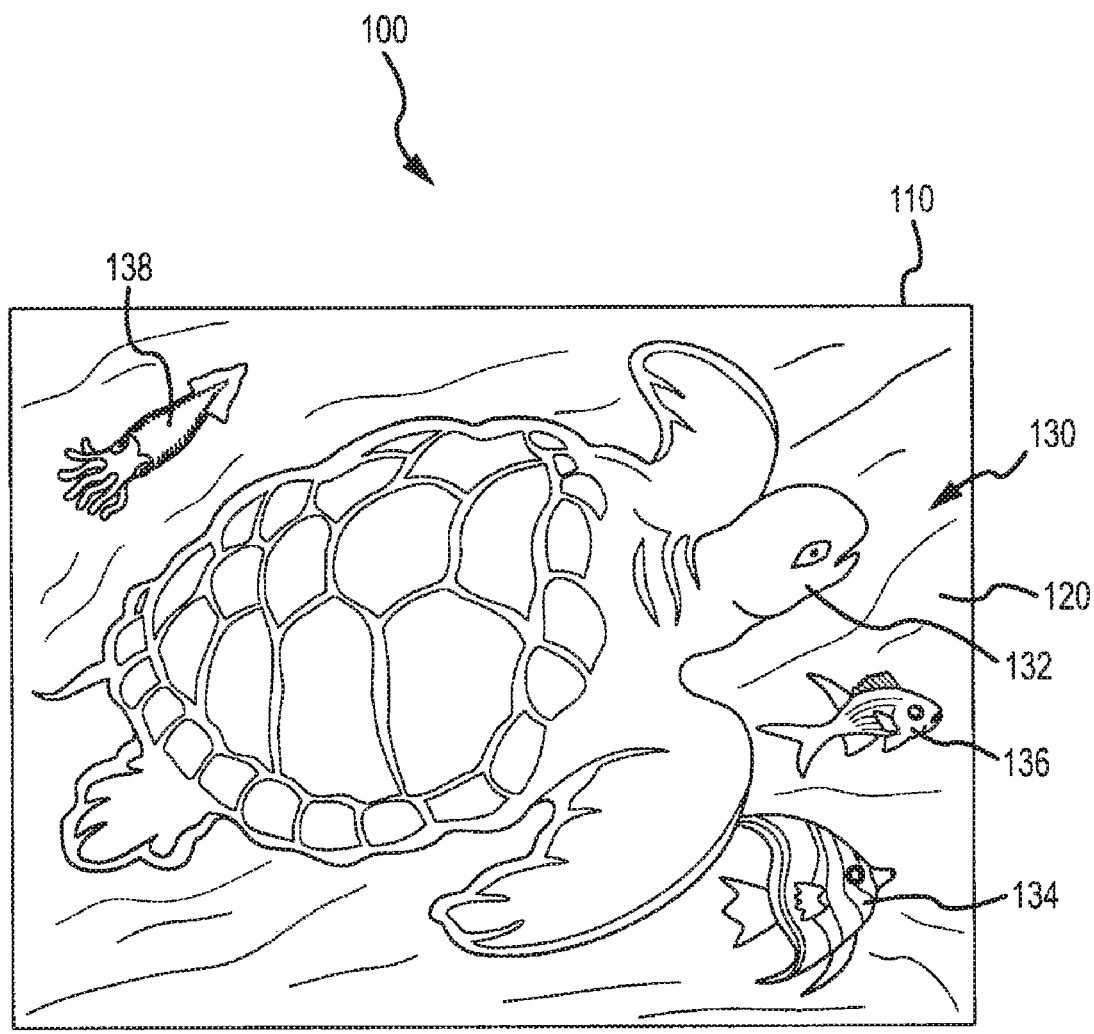
FIG. 1 is a top view of a portion of an interactive projected sandbox (or interactive sand experience system) of an embodiment showing sand with a sculpting framework or guide projected upon a flat or 2D projection surface/screen provided by an upper surface of a sand layer.

In one embodiment, an interactive display system 100 is provided that is configured or adapted to direct a user or player in how to play or interact with the tangible display material (e.g., sand or similar material with readily moved, shaped, or sculpted particles or pieces). System 100 is only partially shown for ease of illustration and explanation of the interactive display method, with a projector and a computer-based control system that would be used to provide the projected images not being shown (but may be provided as shown in the systems 1100 and 1200 of FIGS. 11 and 12). As shown in FIG. 1, the system 100 includes a container or box 110 for containing a volume of display material 120. For example, sand or other material may be provided in a quantity to provide a depth of 1 to 6 inches of the material 120 in container or frame 110. FIG. 1 illustrates the system 100 in an initial operating state in which a player is being encouraged or guided/instructed to sculpt a projection surface/screen using the display material 120, and, as such, the display material 120 may have a substantially flat or smooth 2D surface (e.g., the initial projection surface or screen provided by the display material 120 may be a 2D surface/screen having the shape and dimension of inner walls of frame/container 110).

As shown, the system 100 is operated to project a guide or instructional image 130 upon the display material (or its 2D upper or outer surface). The projected image 130 includes borders or framing lines for one or more projection objects that the user/player interacting with the system 100 is being encouraged or shown to create or sculpt by moving or manipulating the display material 120. In this example, the projected guide image 130 includes four projection objects 132, 134, 136, 138 that are to be sculpted or formed by rearranging the display material 120 (or by sculpting/modifying the initial 2D projection surface to form a user-created 3D projection surface). Each of the objects 132, 134, 136, 138 may be shown in outline form with lines defining the outer (and inner in some cases) borders or boundaries of the shapes of the objects 132, 134, 136, 138, and the user moves the material (e.g., sand) 120 from the other areas of image 130 to form mounds or raised portions of the material 120 to create a 3D projection surface.

In this embodiment of system 100, the projected media 130 may be prepared in a way to direct the user/player how to play in the sand 120 to form the objects 132, 134, 136, 138. For example, the projected media 130 may include an outline of an image of the objects 132, 134, 136, 138 that is projected by a projector of system 100 onto the sand 120 to suggest shadow and form that leads or guides the user/player to sculpt the sand 120 to match the projection 130. In some cases, a digital colored image of a scene to be displayed/projected is preprocessed to filter out the color and provide a black and white guide image 130.

The guide image 130 is projected onto the flat (or relatively flat or 2D) surface of the display material 120, and the user/player acts to interact with the system 100 by lowering the background or non-object portions of image 130 and pile or mound the material 120 up within the outlines/borders of objects 132, 134, 136, 138 defined in projected guide image 130. The amount of sand or material 120 moved from the background sections to the objects 132, 134, 136, 138 may vary widely to practice the system 100, with experimentation indicating that relatively small amounts of depth or differences in a 3D projection surface formed in display material 120 makes visual contrasts very effective when a full color image or movie clip is later projected on the material 120 (e.g., the human brain may act to add or recognize depth to build upon the 3D objects 132, 134, 136, 138). For example, depths (or difference in height of the background and objects 132, 134, 136, 138) may be as little as 0.25 to 0.5 inches to obtain an effective projected display experience.

Figure 2:
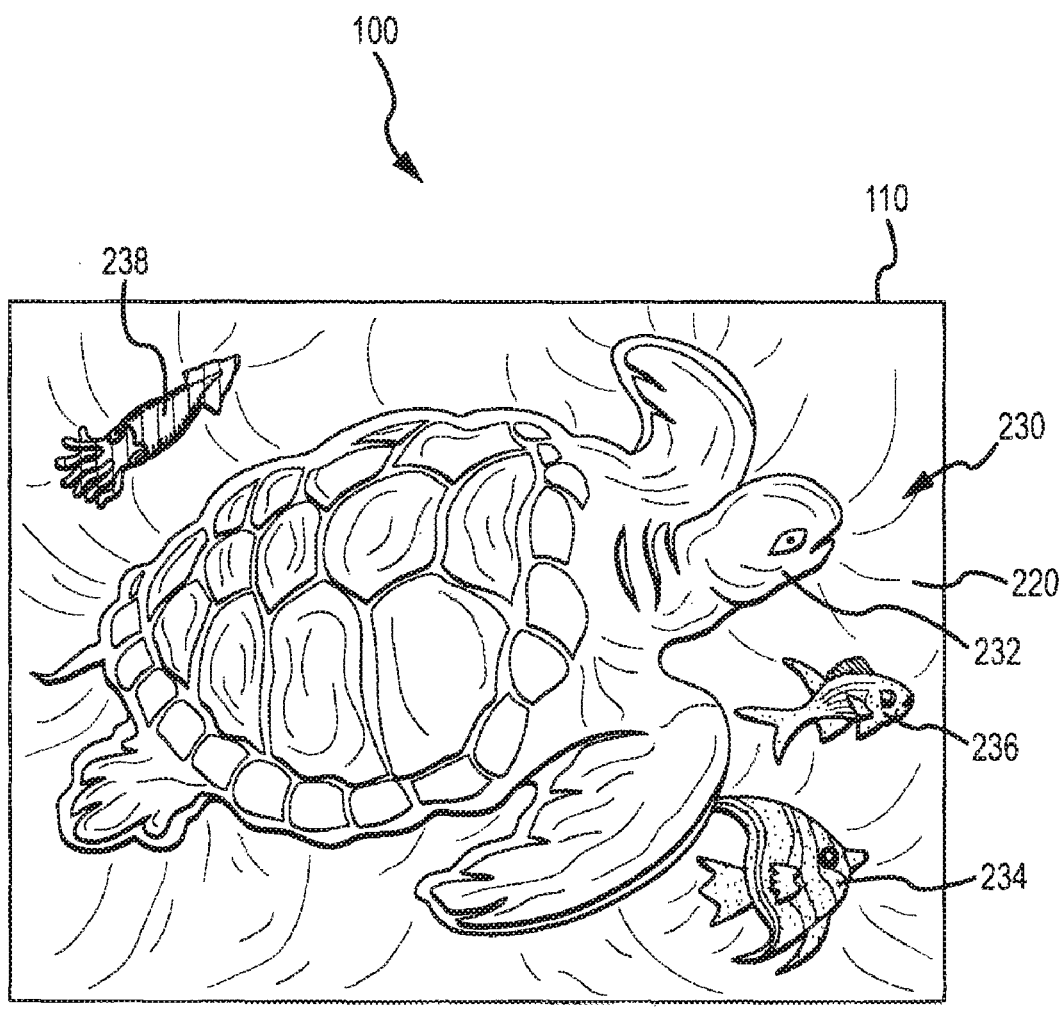
FIG. 2 illustrates the interactive projected sandbox of FIG. 1 after a user has sculpted the projection screen (sand layer) as suggested by the projected framework of FIG. 1 and with a projected color image (e.g., a photograph or animated image) on the 3D projection screen/surface provided by the surface of the sand layer.

FIG. 2 illustrates a second state of operation for the system 100. After the user/player has sculpted the sand or other display material 220 to create a dimensional representation of the image 130 and its objects 132, 134, 136, 138, the projected image 230 is provided by a projector in system 100 such that the display material 220 is magically transformed into a full color, high quality sculpture of the artwork. The projected image 230 is typically in colors that are chosen to show the background or base provided by the lower portions of the 3D projection surface provided by the sculpted display material 220 and to show details of the raised, 3D projection objects 132, 134, 136, 138 that now are colored/covered by images 232, 234, 236, 238 of the projected color media/image 230 (with the coloring of image 230 intended to be shown by shading/hatching provide in FIG. 2). The full color image presents a dimensional (or 3D) display experience that the user/player created even when they may have had no prior experience in sculpture or art (e.g., the system 100 provides a dimensional equivalent of a paint-by-numbers experience with a tangible/user-shaped 3D projection surface provided in material 220).

The image 230 may be a 2D color image projected on 3D projection surface, and exact mapping is not required between the user-formed 3D objects in material 220. Sand such as commercially available playground sand or the like is preferred in some cases as it is readily sculpted and also because it does not present hard edges but instead provides rounded surfaces with the individual particles and formed objects. This provides a more forgiving screen for displaying the objects to obtain a desirable 3D effect. The projected image 230 may be out of focus to a relatively large amount and still obtain an eye-pleasing display. For example, a projector may be 6 to 8 inches out of focus and still get good depth effects with 6 to 8 inches being about a maximum amount of sand that may be piled into a mound to form an object on the 3D projection surface on the display material layer in the container. The newer generation of video projectors, especially projectors that are DLP based, have excellent depths of field, and they can maintain focus over long distances such that 6 to 8 inches or even more out of focus likely will not be a problem.

During operation of the system 100, the switch from projecting guide image 130 to color display image 230 may be a timed occurrence with the guide image 130 being displayed for a predefined period of time and then the system 100 may begin projection of display image 230. The predefined period of time may be selected based on an average time taken by a user/player to sculpt or create the 3D projection surface in display material 220 (e.g., less than a minute to 10 minutes or more varying with the size and complexity of the guide image 130 and/or the expected age, experience, and other parameters associated with the users/players). Alternatively, the switch from the image 130 to image 230 may be a user/player selectable event such as by pressing a button or switch or other interface device in system 100. In other cases, the switch may be controlled by an operator of the system 100 such as when the system 100 is provided in an entertainment facility where the operator may watch the progress of the users/players interacting with system 100. In other cases, the switch may be timed/scripted such that audio and/or visual cues are provided to guide the interaction such as lighting one of the objects 132, 134, 136, 138 at a time to get the user/player to form each in sequence and the selective lighting may be joined with auditory instructions such as a taped script or operator providing instructions to work on one of the objects and then a next and so on with a warning that the image 230 will soon be shown. Numerous other techniques may be used for providing an interactive experience through operation of system 100.

Figure 3:
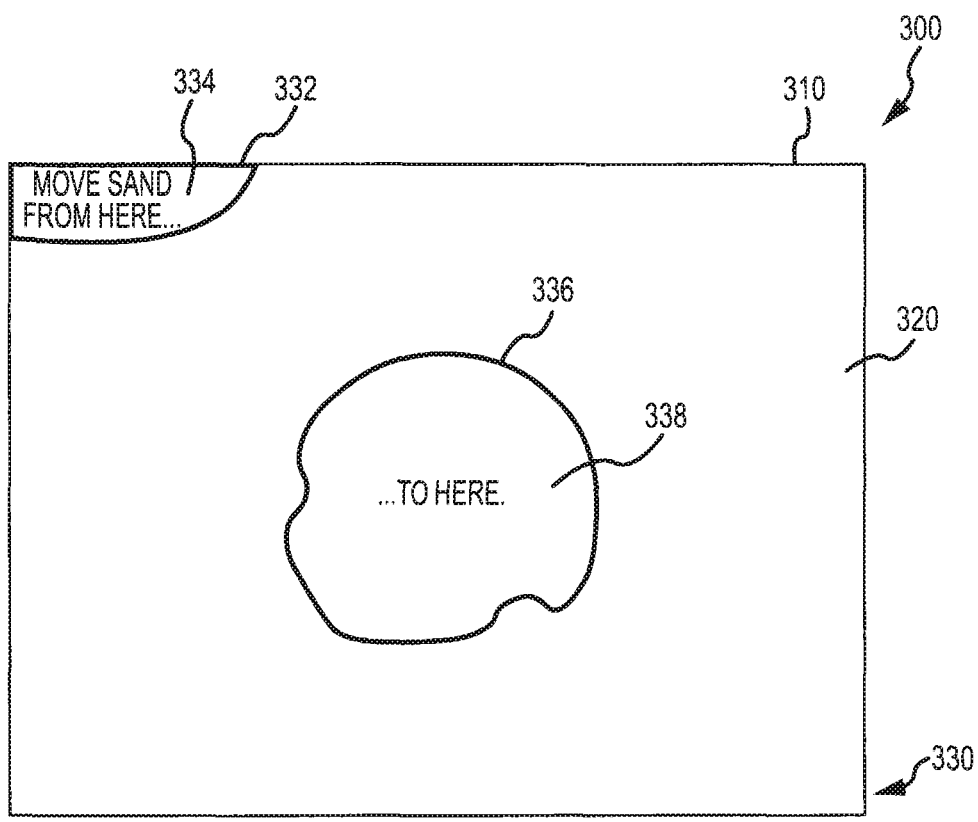
FIGS. 3-6 illustrate an interactive projected sandbox of an embodiment during use to sequentially display a scripted sculpting framework or guide used by the sandbox or interactive sand experience system to guide a user in sculpting or molding the 2D surface of the sand into a 3D projection screen.

In some embodiments of interactive display systems, it may be useful to provide a linear story or interaction in which a story can be presented where the user is prompted to move the display material or sand in predetermined ways through simple projected prompts or instructions. For example, FIGS. 3-6 illustrate an interactive projected sandbox 300 as it is being operated to instruct a user/player in a sequential manner to build or form a particular 3D projection surface on the top or outer surface of the sand (or other display material). As shown in FIG. 3, the system 300 includes a container 310 in which a volume of sand 320 is provided and upon an upper surface of the sand 320 a first guide or instruction image 330 is projected (by a projector positioned above the container 310 for example).

The projected guide/instruction image 330 includes a first portion or section that is defined by a projected border or outline 332 that is guiding the user to move sand 320 from this area, such as with a projected instruction or message 334. The projected guide image 330 also includes a second portion or section that is defined by a projected border or outline 336 and that is designed or provided to guide the user to place the sand 320 removed from the first section 332 to within the border 336, such as with projected instruction or message 338. As with system 100, the first guide image 330 may be projected for a predefined amount of time, until the user requests a next instruction, based on a script, or until a next slide or image is chosen by a system operator.

Figure 4:
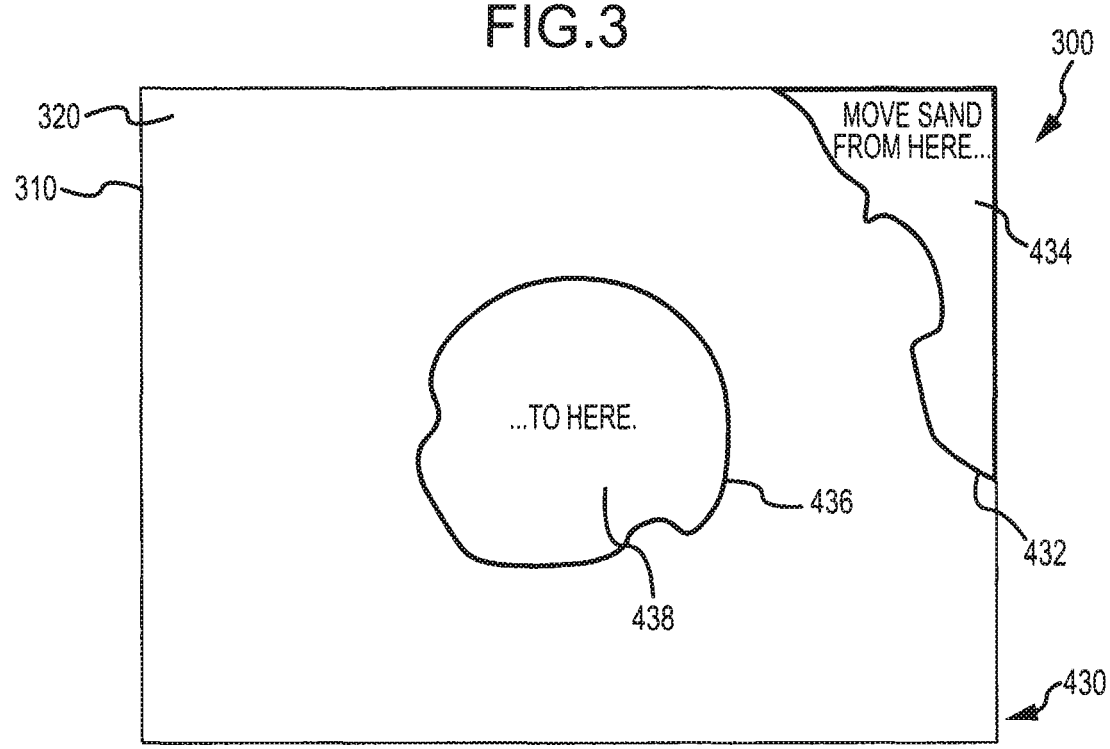
Figure 5:
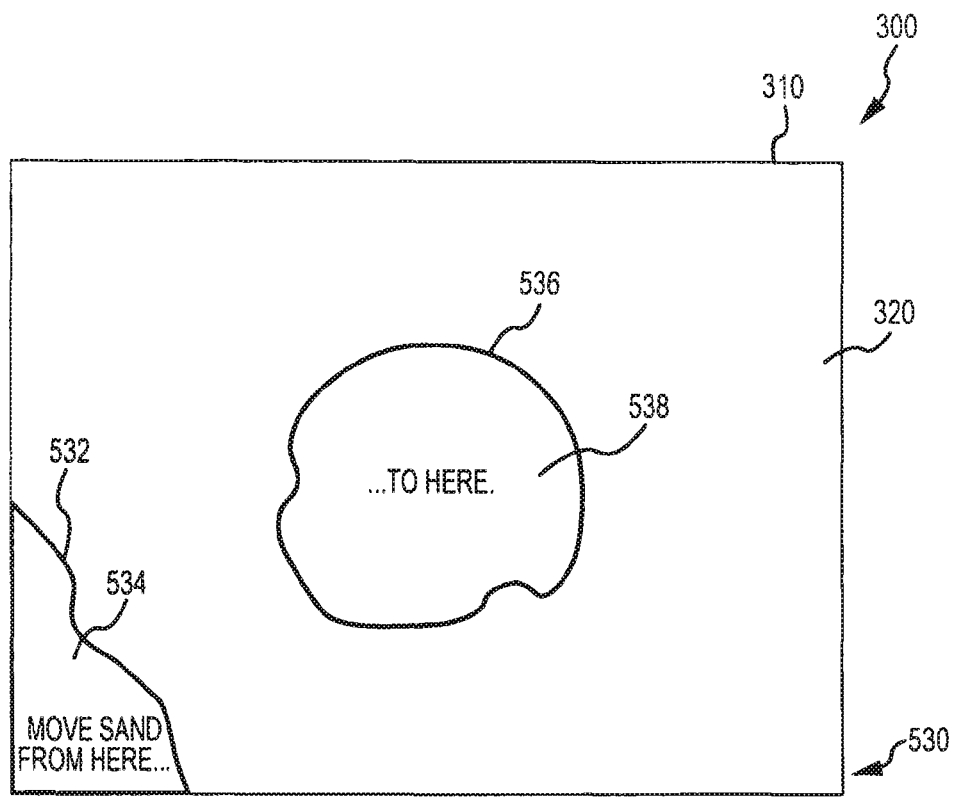
Figure 6:
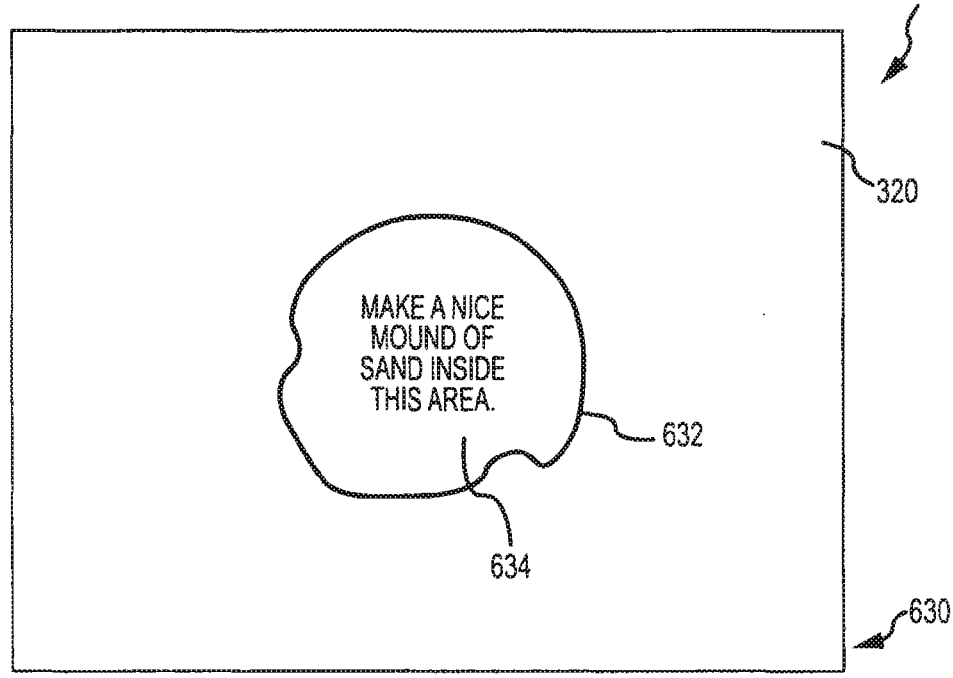

In FIG. 4, a second guide/instruction image 430 is projected upon the display material or sand 320. This image 430 includes a third portion or section that is defined by a projected border or outline 432 and that is designed to encourage the user/player such as with a message or instruction 434 to move a volume of the sand 320 away from this section. The image 430 also may include an outline or border 436 of the second portion or section with a text or other message 438 (both of which may remain unchanged from image 330 or one or the other may change as may the location of the section as it may be useful to build more than one 3D object in sand 320). Similarly, FIG. 5 illustrates a third instruction or guide image 530 that may be projected by a projector upon the sand 320 to show a fourth portion defined by border or outline 532 that guides the user/player via instruction or message 534 to move sand 320 from this portion and place it in the second section or portion defined by border 536 (and in response to message or instruction 538). Finally, a fourth instruction or guide image 630 may replace image 530 (e.g., after a set time period or using a script or in response to a user or operator selection/command) with a border 632 defining the object being formed with an instruction or message portion 634 instructing the user/player to shape the previously placed or moved sand 320 into a shape (e.g., a mound to form a volcano in this particular example).

After the scripted set of guide images 330 to 630 have all been sequentially projected (e.g., a set of still or motion images urging the user/player to form a 3D projection surface from the sand 320), the system 300 may be operated to project one or more still color images or a movie clip as shown in FIGS. 7-10. In the example, the user-created 3D projection surface on the sand 320 is used to display a full color movie that provides a magical transformation of the otherwise bland, single-colored display material such as tan sand. In the illustrated example of system 300, a movie of an erupting volcano is displayed on the 3D projection surface.

Figure 7:
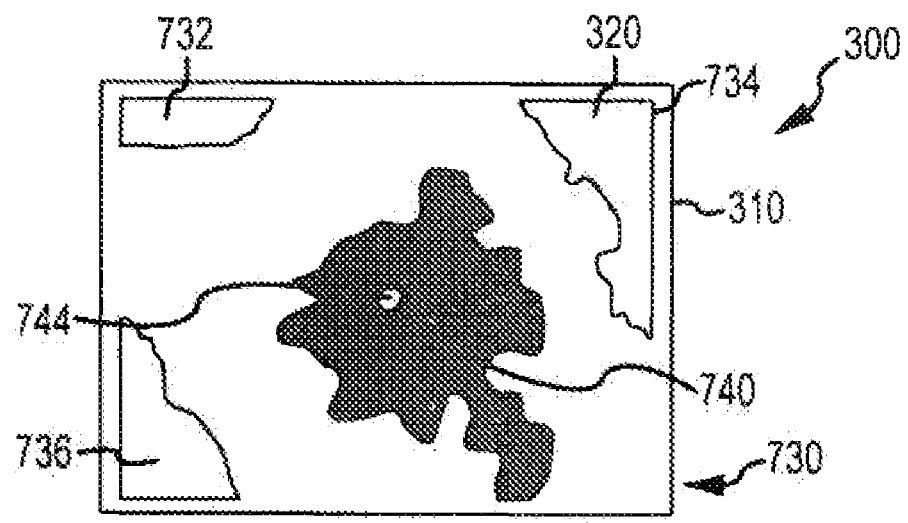
FIGS. 7-10 illustrate the interactive projected sandbox of FIGS. 3-6 after the 3D projection screen is formed and during use of projector to display a movie or video clip upon surfaces and/or 3D objects formed by the user based on the previously projected sculpting framework with this exemplary figure representing a lava flow on a volcano as one possible application or use of the sandbox.

In FIG. 7, the system 300 operates to project a beginning scene or frames of a movie clip or file (e.g., stored in system 300 memory and cued up by a timed script or in response to a user or operate selection of a movie projection button or switch such as may be presented on a touch screen or user interface on a monitor or the like). As shown, a first color image 730 is projected by a projector of system 300 on sand 320, and, interestingly, the image 730 includes generally four projected sections or objects that are generally aligned with or mapped to the four sections or portions earlier provided in the guide or instruction images. Specifically, a first water/ocean portion or image 732 is displayed on the 3D projection surface of the sand 320 in the first section where sand was removed, a second water/ocean portion or image 734 is displayed on the sand 320 in the second section where sand was removed, a third water/ocean portion or image 736 is displayed on the sand 320 in the third section where sand was removed, and a mountain image 740 is displayed upon the section of the guide images where sand was added or piled to provide a dimensional or raised 3D object. A top or opening of the volcano image 744 is mapped generally to the center or high spot of the 3D projection surface on the sand 320 showing bubbling or moving lava.

Figure 8:
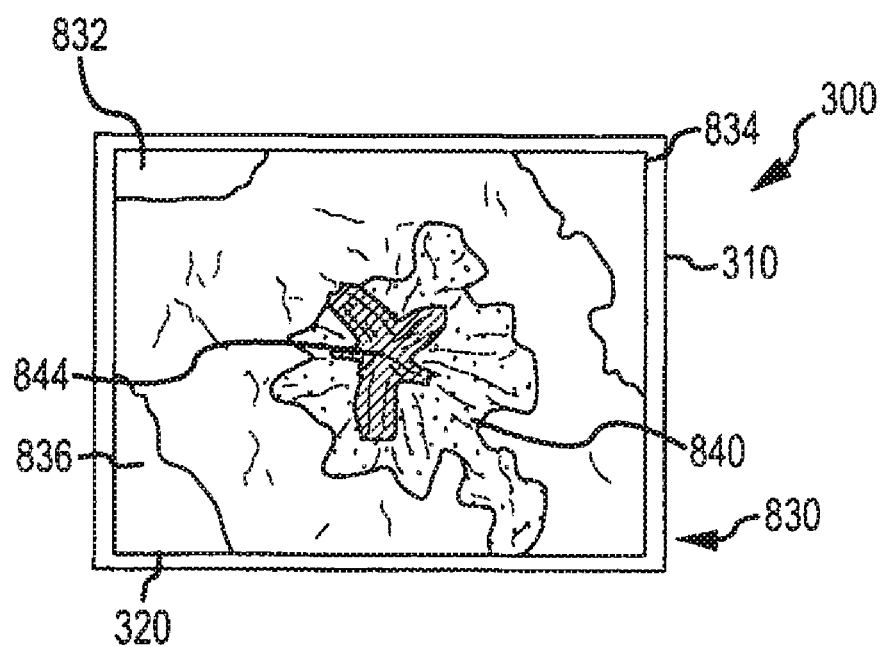
Figure 9:
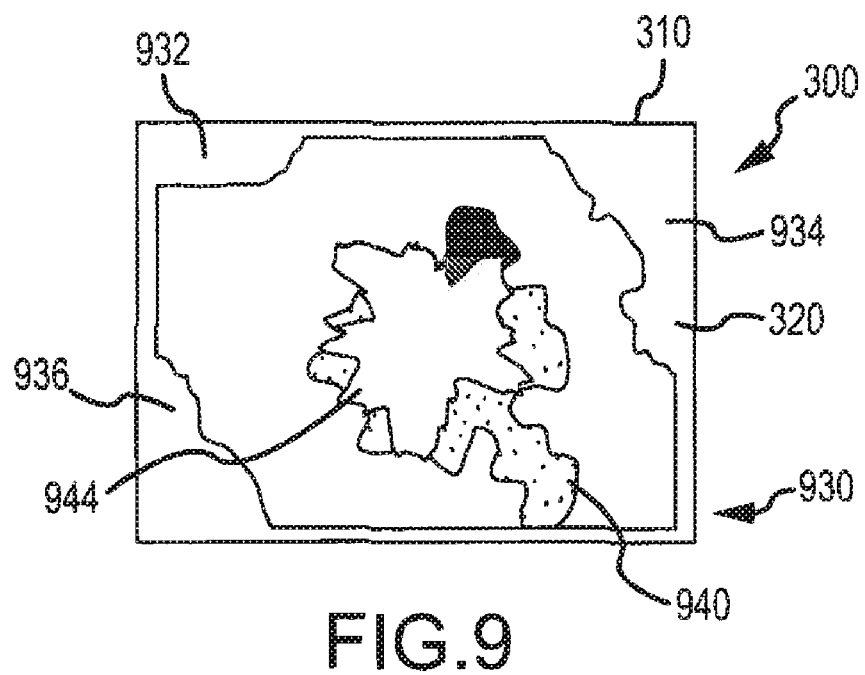
Figure 10:
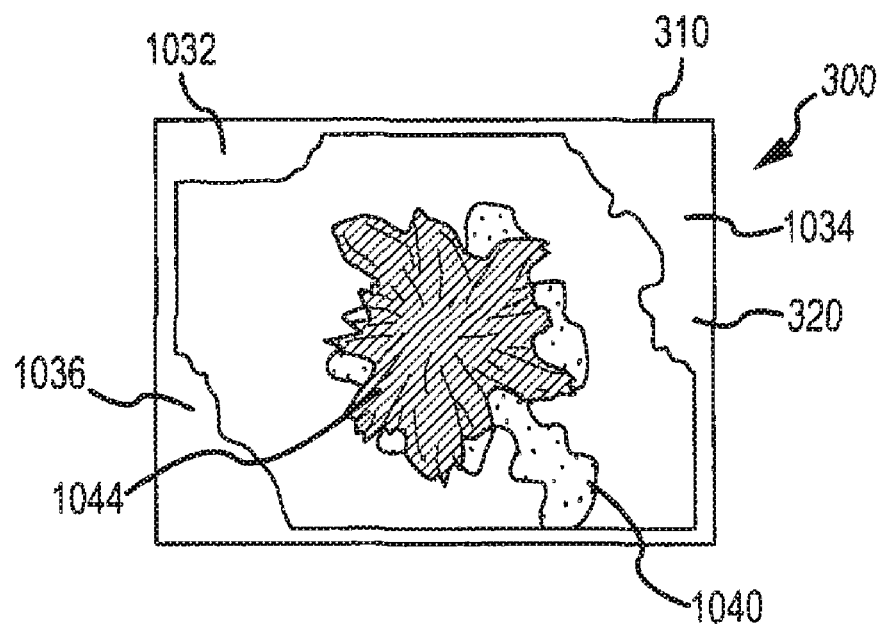

In FIG. 8, the projected image 830 is shown later in time with the volcano image 840 becoming more active with a volume of lava 844 being shown to be erupting or escaping the volcano 840 and beginning to flow down the 3D projection surface toward the lower ocean sections covered by images 832, 834, 836 (which may not have changed from FIG. 7). In FIG. 9, the projected color image 930 shows the eruption in a later stage (or later frames of the movie or animation clip/segment). The volcano image 940 is projected on the raised portion of the sand 320 with the flowing lava portion 944 growing in size and flowing more toward the ocean portions 932, 934, 936 of the image 930. A yet later stage of the eruption may be projected using system 300 as shown in FIG. 10 with the image 1030 including the volcano image 1040 that is again projected on the mound/raised portion of the 3D projection surface on the sand 320 with a growing lava field image 1044 moving toward the ocean portions 1032, 1034, 1036.

The display material or sand 320 is relatively forgiving such that exact edges or borders of objects such as the mountain 1040 and water 1032, 1034, 1036 do not need to exactly match the corresponding sculpted portions of the 3D projection surface, but it is desirable for the images 730, 830, 930, and 1030 to be generally configured or designed to have the projected volcano and water matching the sculpted surfaces that the user was instructed/guided to form. In practice or use of system 300, the inventor has proven via testing that this delivers a compelling visual event that the user can create via interaction with the display material or sand in a matter of a few minutes.

Figure 11:
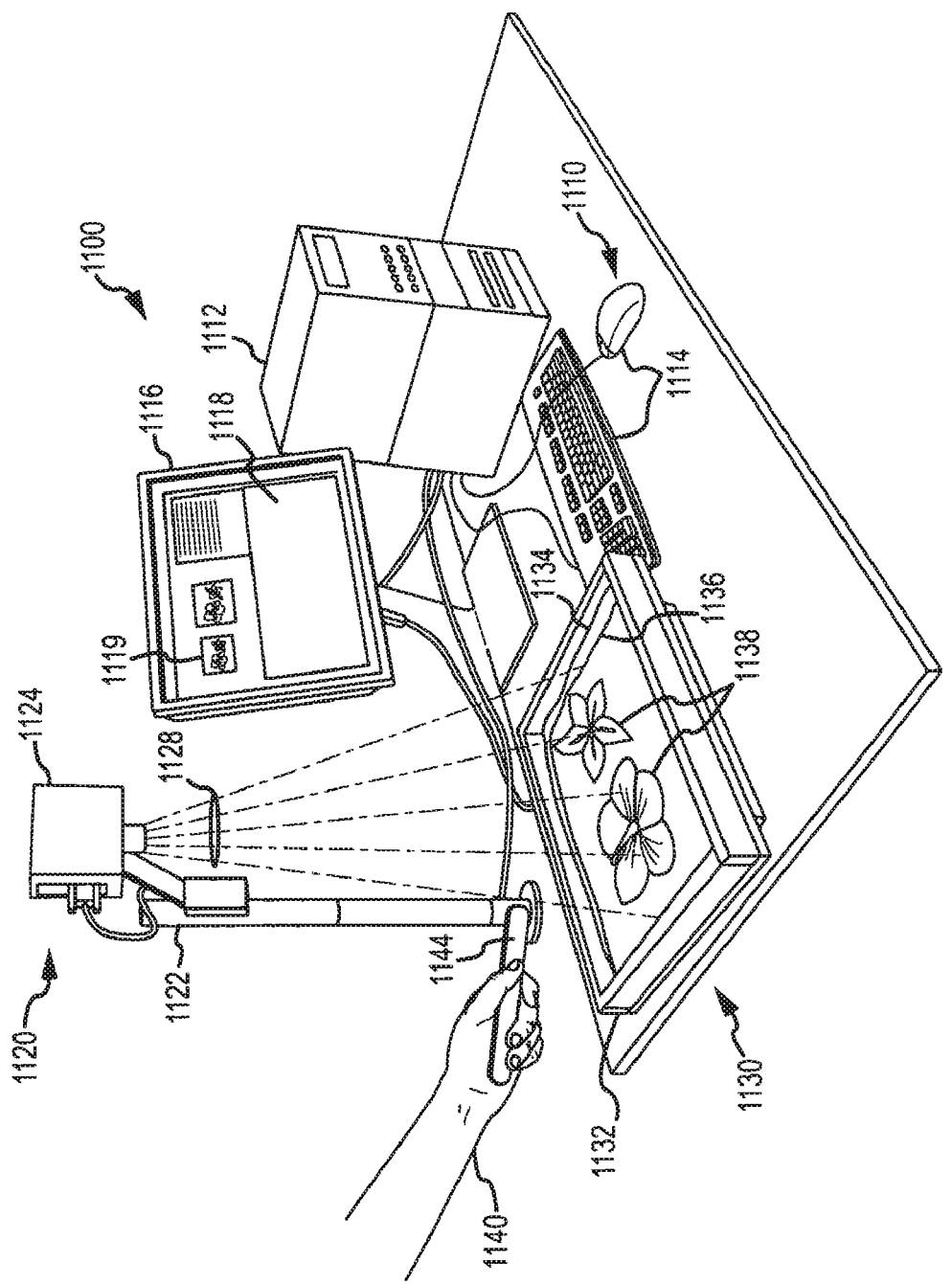
FIG. 11 illustrates an interactive tangible display system of an embodiment as may be used for home or entertainment facility use for allowing a player/user to interact with a tangible projection surface/screen (e.g., a surface formed of a media such as playground sand that can readily be sculpted or shaped to a 3D pattern associated or mapped to a projected image)

FIG. 11 illustrates an interactive display system 1100 according to one useful embodiment as may be used in a home setting or application or that may readily be adapted for use in an entertainment facility. As shown, the system 1100 generally is made up of a control assembly 1110, a projection assembly 1120, and an interactive/tangible projection screen assembly 1130. The control assembly 1110 may take the form as shown of a computer 1112 that may include a processor, software, and memory to provide the control over projections of images 1128 as described herein (e.g., a convention desktop, laptop, notebook, or other computer may be used for this purposes). The control assembly 1110 also include a number of user input/output (I/O) devices 1114 such as a keyboard, a mouse, a touchscreen/touchpad, and the like, with each of these operated by the computer 1112 and its software to allow a user/operator to enter user data such as to choose a set of guide images and display images, to trigger a switch from guide images to display images, to start a movie, and so on. The assembly 1110 also may include a monitor/display 1116 run by the computer 1112 to provide a graphical user interface (GUI) 1118 that may be used to prompt an operator to select an 3D projection surface to sculpt with its associated guide image(s) and 2D or other color image(s) or movie/animation files stored in memory of computer 1112 (or accessible by computer 1112 such as via a network communication link). As shown, the chosen image 1119 for use in creating a 3D projection surface and later an interactive display is shown in the GUI 1118 on monitor 1116.

The system 1100 includes a projection assembly 1120 that takes digital images (still or motion image files such as in the PEG, MPEG, or other formats) from the control assembly 110 and projects images 1128 onto the projection screen assembly 1130. The assembly 1120 is shown to include a base or stand 1122 that supports a projector 1124 over the projection screen assembly 1130, such as with the outlet or lens of the projector 1124 directed toward a center of container/frame 1132 or otherwise focused to provide a desired projected image 1128. The projector 1124 may take numerous forms to practice the system 1100, and, for example, may be a DLP (digital light processing), LCD (liquid crystal display), LCOS (liquid crystal on silicon), or other technology-based projector or video projector with a wide range acceptable definitions (e.g., high definition is not required in system 1100). Image quality is generally unaffected by the imaging device technology provided in the projector 1124 because the projecting upon the granular or particular display materials such as sand-based material 1134 provides a forgiving display surface 1136 with regard to accurate focusing and details of the image 1119 when the projector 1124 is operated by control assembly 1110 to provide projected image 1128 (which may be one or more guide/instruction images or one or more display images or movies/animation segments such as a 2D or 3D color movie as shown with the erupting volcano in FIGS. 6-10).

The system 1100 also includes a tangible/interactive projection screen assembly 1130 that includes in this case a box or frame 1132 that is used to hold a volume of granular or particulate display material 1134. For example, the container 1132 may have a rectangular recessed surface that can receive sand such as commonly-available playground sand or the like to a depth of 0.25 to 8 inches or more (e.g., walls on the box defining a recessed surface of 8 to 10 inches to retain piled/sculpted sand) with a range of 0.5 to 4 inches being useful in some applications. The display material 1134 provides a projection surface or screen 1136 for receiving projected images 1128, and as shown, a user 1140 may use one or more sculpting tools 1144 (such as a spoon or knife-like instrument, a wooden or plastic paddle, or the like) to form one or more 3D projection-receiving objects as shown at 1138 on the surface 1136 by relocating/moving a volume of the sand 1134.

The projected image 1128 may include colored or black and White images that are at least loosely mapped or aligned with the locations of the objects 1138 (e.g., flowers in this example of system 1100 may be mapped to sculpted objects simulating an outline or bordering frame of flowers that may have earlier been projected in images 1128 as guide images as explained above). In this manner, a 3D display experience is provided by the system 1100 with the user 1140 interacting with or creating a 3D projection surface or screen 1136 with the display material 1134 in container 1132.

Figure 12:
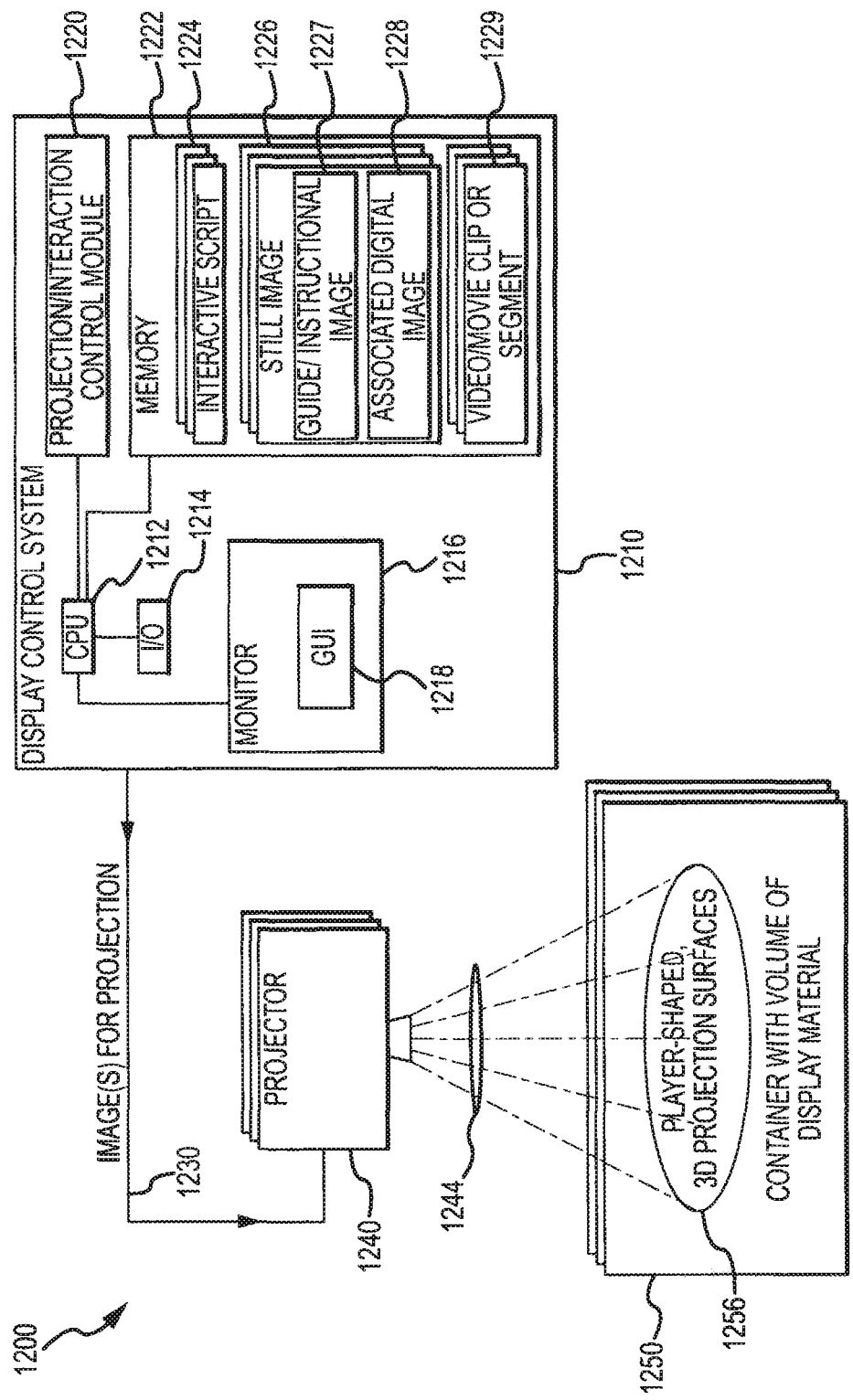
FIG. 12 is a functional block diagram of a system for digitally augmenting a 3D projection surface or screen formed of tangible/sculptable/shapeable material (such as sand) with a projected image or media.

FIG. 12 illustrates a functional block diagram of an interactive display system 1200 according to another embodiment. The system 1200 may be used in settings where it is desirable to concurrently provide two or more interactive experiences such as may be the case in many entertainment facility settings, and each of the interactive experiences may be operated in a like manner to provide the same experience or may be operated independently to provide differing displays with differing 3D projection surfaces and projected images. As shown, the system 1200 includes a display control system 1210 that includes a processor 1212 that controls operation (such as with an operating system) of I/O devices 1214 used to receive information and instructions from an operator of the system 1210 as well as a monitor 1216 that may be used to display a GUI 1218 to an operator. The system 1210 also runs software to provide the functions described herein (e.g., to perform all or portions of the method 1300 of FIG. 13) such as a projection/interaction control module 1220. The module 1220 may be used to generate the GUI 1218 to prompt an operator to select an interactive experience for each of the containers 1250 and/or to trigger next operating stages or states of the experience (e.g., move from one guide image to another or from a guide image to a display image).

The control system 1210 may also include memory 1222 that stores one or more interactive scripts 1224 that may be used to provide an interactive display experience such as by defining which guide images and display images are provided in an experience and when switches are made between the chosen images of the scripted experience. The memory 1222 may also store sets of still images 1226 for use in the interactive display experiences, and the still images 1226 may include guide/instructional images 1227 (e.g., black and white or colored images guiding a user/player in how to form a 3D projection surface/screen) and associated digital images 1228 (e.g., color images that are associated with the various portions or section of the user-sculpted or formed 3D projection surface that may include, for example, displaying a photo or animation of a character or animal upon a sculpted character or animal or a photo or animation of a castle upon a sculpted sand castle and so on). Again, the mapping or alignment (e.g., matching of X-Y coordinates or the like) of the images 1228 with the corresponding objects formed in a 3D projection surface 1256 do not have to be exact but preferably at least partially or generally overlap or correspond to achieve a desirable display (e.g., experience is enjoyable for young children as well as experience teenagers that may have widely ranging abilities to follow guide images).

The memory 1222 may also store video/movie files 1229 that may be chosen by the control module 1220 for use in projecting images upon the 3D projection screen 1256 (e.g., see FIGS. 6-10 and the corresponding discussion). The images and scripts may also be downloaded or accessed from remote data storage by the control system 1210 during operation of the system 1200 such as via a digital communication link (wired or wireless) with a network such as the Internet, a LAN, a WAN, or the like to which data servers are provided. Note, the media or images may be video based on still and/or motion videos. The file formats and media server technology may be of a variety of types ranging from simple Flash-based servers to high end, high-definition servers. In addition, PC-based media presentation system may be used to script linear stories, and, generally, the components used to implement the system 1200 and deliver the media to the projectors may be off-the-shelf or commercially available that is used to provide the unique functions/interactive experiences described herein.

The system 1200 operates to transmit the images for projection 1230 from the control system 1210 to one or more projectors 1240, and the system 1200 includes one or more containers 1256 each with a volume of display material (such as a layer of sand 2 to 6 inches deep or other granular material) that a player/user may shape or sculpt to form a 3D projection surface 1256. Again, the projectors 1240 may be operated concurrently to display the same images 1230 as projected images 1244 or may be operated independently to project 1244 differing images 1230. The projectors 1240 may be DLP projectors, LCD projectors, or other projectors and may be provided above the containers 1250 with their output or projected light 1244 being focused on the 3D projection surfaces 1256 within the container 1250.

In another variation of the system 1200, one of the projectors 1240 may be a very large, high output video projector that is hung high in the air over a sandy beach area. In other words the container 1250 may be quite large (such as a floor and/or walls of a cruise ship) or even be natural or manmade features such as land underneath a beach (e.g., as may be found at a resort). The projector 1240 may be operated by the control system 1210 to project multiple "sculpt-by-number" experiences in a number of areas of the sandy area/container 1250 to create video pools on the sand 1256 below the projector 1240. Users/players (or guests of a resort or cruise ship) may sit and interact with their own projected sand area, experiencing changing imagery provided by projected images 1244 on their sculpted 3D projection surface 1256.

Figure 13:
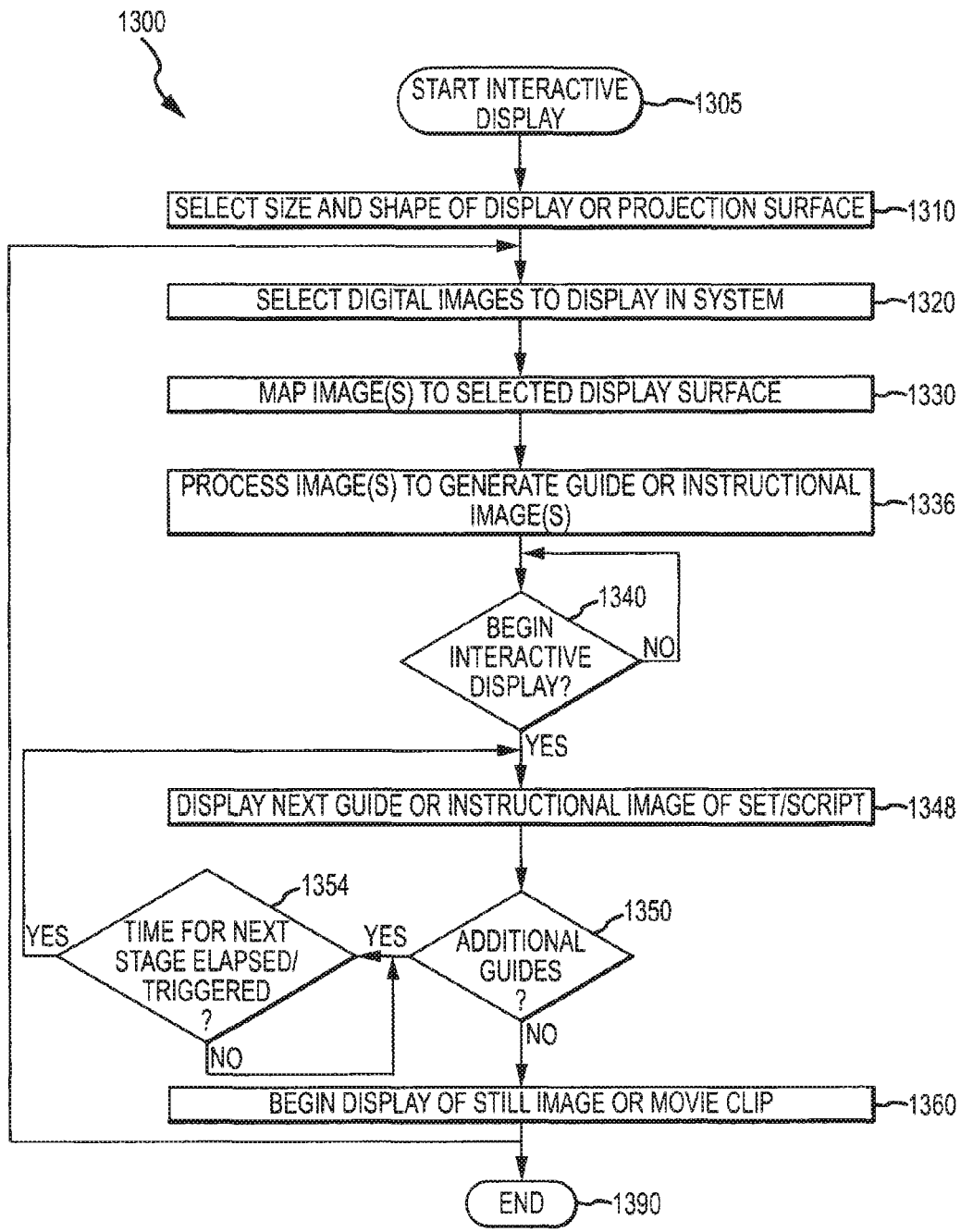
FIG. 13 shows a flow diagram of a method for operating or providing an interactive projection or display experience such as by operation of the system of FIG. 11 or FIG. 12.

FIG. 13 illustrates an interactive display method 1300 that may be provided using one or more of the systems described herein. The method 1300 starts at 1305 such as with designing one or more containers for holding display material (such as playground sand or the like). In some cases, the container may be relatively small such as a square box that is 12 by 12 inches or the like to a much larger container such as a circular container that is 4 to 6 feet or more in diameter while in other cases the "container" may be very large such as a beach at a resort or a "beach" area of a cruise ship.

In step 1310, the method 1300 includes defining a size and shape of the display or projection surface to be utilized for projection of guide and display images, and this may be the entire available internal area of a container or some subset of this area (e.g., a container may be 6 feet in diameter but it may be desirable to only project on a 3-foot diameter circle within this larger circle), with the particular size/shape not being limiting of the method 1300 but being a parameter that typically is preset to allow proper focusing of the images with the projector (although some embodiments may call for refocusing/moving of a projector or use of multiple projectors to project on more than one projection area or 3D projection surface within a container).

At step 1320, one or more digital images are chosen for use in creating a display experience in the interactive display system. At 1330, the selected images are mapped to the selected display surface such as by sizing and/or shaping the image to the planned display surface within a container (e.g., crop a rectangular image to be projected within a circular projection area or the like with a proper diameter). The images are also processed at 1336 to generate one or more guide or instructional image(s), and this may involve simply filtering out color as shown with FIGS. 1 and 2 or it may be more complicated as shown in FIGS. 3-6 where a scripted set of guide images with instructional text is generated to walk a user/player through creation of a 3D projection surface in a step-by-step manner to form a number of projection sections or areas of a 3D projection surface. The guide images and corresponding display images/movies are then stored in memory for later use in creating an interactive display experience.

At step 1340, the method 1300 includes determining whether a new interactive display is to be started. If not, a waiting loop may be begun. If yes, the method 1300 continues at 1348 with displaying a next one of the guide or instructional images for the image set or associated with a particular chosen display script (e.g., a script may be created as part of step 1336 defining which guide images are shown and when a switch to a next one is made (e.g., a predefined stage-elapsed trigger or the like) and when/which display images are shown after the last guide/instructional image). The script may indicate that there is a set of 1 to 10 or more guide images that is to be shown to guide a user in forming a 3D projection surface (e.g., scoop sand or other display material from one area/section of the container/starting or base surface and place it in another location having a particular outer shape/outline). A control module running on a control system may be used to track a currently displayed image and to queue up and display a next one in a series or set of guide images.

At 1350, the method 1300 includes determining whether there are additional guide images to be displayed (e.g., with a control module inspecting the script or accessing memory storing an image set). If yes, at 1354, the control module may also determine whether the time period for the presently displayed guide image has past. If not, a waiting period/loop occurs. If the display period has past or a trigger has been received from the user or an operator, the method 1300 continues at 1348 with retrieving and displaying a next one of the guide images. After all the guide images have been displayed for their display time period, the 3D projection surface may be assumed to have been formed by the user/player, and the method 1300 then includes at 1360 using the control module to display the display image(s) or starting a movie/animated film via one or more projectors focused upon the 3D projection surface (e.g., such that the output or projected image has its projected components mapped or aligned to the corresponding objects/sections of the 3D projection surface). The method 1300 may continue at 1320 (or 1340) with obtaining images for a new experience (or repeating the current interactive display experience) or the method 1300 may end at 1390 such as by darkening the projector(s) to reveal the display material without any color/projected imagery.

The above described invention including the preferred embodiment and the best mode of the invention known to the inventor at the time of filing is given by illustrative examples only. It will be readily appreciated that many deviations may be made from the specific embodiments disclosed in the specification without departing from the spirit and scope of the invention. For example, the display material used may be nearly any material that is readily sculpted with sand or other granular or particulate-type material being just one useful example. Particularly, conventional playground sand may be used with the tan or brown coloring, grain size/shape, and typical moisture (which facilitates sculpting at least to some degree) being useful for forming the 3D projection surface. Further, there may be issues related to use of sand and safety, and sands that are recognized in the industry as being safe for play environments may be used in some implementations for the display material such as "safe sand" that is white or colored and that typically includes natural sand that does not have free crystalline silica dust or that is not formed by processing quartz (e.g., see sand safety and sand materials for use as the display material at http://www.safesand.com/information.htm).

In some cases, the display material may be another color other than tan/brown, and further, it may be useful to modify the surface or gains of the material to achieve a desired projection or enhancement result in response to the projected images/media. This may involve selecting the colors and makeup of the materials to achieve a desired result such as to achieve a particular gain (e.g., achieve a gain of 1 to 1.5 or the like), and the gain may be varied on the 3D projection surface to provide desired results. Some display or digital augmentation systems may utilize automatic projector/camera alignment techniques. Also, the display systems may utilize more than one projector (e.g., be multi-projector systems to provide augmentation or projected images/media) and such systems may utilize hardware/software devices and/or controllers to provide synchronization of the multiple projectors to achieve a synchronized or desired projected image/media on a 3D projection surface.

In another version of an interactive display system (not shown), sand may be pre-sculpted into 3D components on a 3D projection surface such as into castles, and these pre-sculpted or formed components may be projected upon at night or in a dark room to tell a story about or animate the pre-formed 3D projection surface. For example, users/players may be provided pre-assembled or selected sand forms (or sculpting forms), and the 3D projection screen builders or sand sculpture teams may be instructed to build, such as with a displayed guide image or by other instructions (e.g., a printed map/recipe or the like) that may include physical markers in a container or on a beach area, the castle or other object that would later be included in a 3D projection surface/screen in a predefined location (such as on a beach or in a container). One or more projectors may be installed in fixed locations above or near these predefined locations, and media may be prepared in advance using templates that match the sand castle shape to provide proper mapping of the color/displayed image to the 3D projection component/surface. In use, for example, after the Sun sets, a nighttime event may be provided by operation of the projector to project the mapped display images upon the 3D projection surface including the 3D component/castle such that the user-sculpted castle/component comes to life through digital still or video projections that align to the castle/component form.

Typically, the specific topography of the 3D projection surface is assumed to generally comply with projected guide images and interaction by a user with the sand or other display material does not need to be closely tracked or determined in real time. However, there may be implementations of the interactive display systems where it is desirable to track/determine user interaction with the display media and to react by providing a display or guide image that is modified to suit or react to the user interaction. For example, interaction with the display media may be provided in a number of ways. In some embodiments, the interaction may be based upon sensing or tracking the topography or shape/volume of the 3D projection surface and then updating/modifying the projected image based on detected changes (e.g., movement of volumes of sand on an upper or base surface of the sand layer).

The tracking of the projection surface topology/shape may be performed using one or more presently available (or later developed) spatial measurement technologies, e.g., a 3DV Z-Cam or a secondary camera sensing a structured light pattern being projected on the projection surface. This depth or shape sensing enables the interactive display system to react to changes in the display material such as by creating an animated image that more closely suits or matches the 3D projection surface being formed by the user/player. In another case, movement of a drawing or sculpting tool may be tracked and an image generated in response by software/hardware and then projected in real time by operation of a digital projector onto the projection surface based on tracked movement and/or positions of these tools. For example, a reflector may be provided on the tip of a tool or stick that allows a user or performer to "draw" in the sand in real time as the location of the reflector is tracked and then an image is projected in locations where the stick/tool was moved near or in the 3D projection surface.

I claim:

1. A method for creating an interactive display experience using a layer of granular display material, comprising:
sequentially projecting images from a set of guide images upon an upper surface of the granular display material;
projecting display images mapped to the guide images upon the upper surface of the granular display material;
tracking a tool;
generating an image in response to the tracked tool; and
projecting the generated image onto the upper surface of the granular display material.

2. The method of claim 1, wherein the step of projecting the display images mapped to the guide images includes a controller operating a digital projector based on an interactive display script.

3. The method of claim 2, wherein the interactive display script comprises a time period associated with each of the guide images and the controller operates the projector to display each of the guide images for the associated time period.

4. The method of claim 1, wherein the guide images are projected onto a projection area on the upper surface of the granular display material and wherein the guide images and the display images are mapped to the size and shape of the projection area.

5. The method of claim 4, wherein the display images each contain image elements mapped in size and location relative to the projection area to sculptures defined within the guide images projected on the upper surface.

6. The method of claim 1, wherein the generated image is static.

7. The method of claim 6, wherein the generated image includes at least a portion that is animated.

8. The method of claim 1, further comprising tracking a topography of the upper surface of the granular display material and wherein the generating of the image is based on the tracked position and the tracked topography.

9. The method of claim 1, wherein the tool tracking further comprises tracking a position of the tool.

10. The method of claim 1, wherein the tool tracking further comprises tracking a position of the tool relative to the upper surface of the granular display material.

11. An interactive display method, comprising:
focusing an image on an upper surface of sculptable display material;
providing an interactive display script, a set of guide images, and a set of display images mapped to the guide images;
based on the interactive display script, sequentially projecting the guide images upon the upper surface and then projecting corresponding ones of the display images upon the upper surface of the sculptable display material; and
tracking a position of a tool relative to the upper surface;
generating an image in response to the tracked position; and
projecting the generated image onto the upper surface of the sculptable display material.

12. The method of claim 11, wherein the interactive display script comprises a time period associated with each of the guide images and the act of sequentially projecting the guide images comprises projecting each of the guide images for the associated time period.

13. The method of claim 11, further comprising mapping the guide images and the display images to a size and a shape of a projection area on the upper surface.

14. The method of claim 13, wherein the display images each contain image elements mapped in size and location relative to the projection area to sculptures defined within the guide images projected on the upper surface.

15. A method for providing an interactive display, comprising:
providing a volume of a particulate material with an exposed upper surface;
selectively controlling a projector to display at least one guide image upon the exposed upper surface during a first period of time and to display at least one display image upon the upper surface after the first period of time,
wherein the guide image includes an image providing a guide for sculpting the granular material into a 3D object and the display image includes a component mapped to a location of the 3D object, and
wherein the component of the display image is projected on a portion of the exposed upper surface being sculpted into the 3D object.

16. The method of claim 15, wherein the sculpting guide comprises at least an outline of the 3D object at a predefined location on the upper surface of the sand.

17. The method of claim 16, wherein the sculpting guide further comprises an additional outline of a material removal area defining a source location for a volume of the sand to form the 3D object within the outline of the 3D object in the sculpting guide.

18. The method of claim 15, wherein a plurality of the guide images are displayed using the projector during the first time period, each of the guide images including at least one outline of a 3D object, whereby step-by-step visual cues for forming a 3D projection surface are displayed on the upper surface of the sand.

19. The method of claim 15, wherein the projected guide image and the projected display image are sized and shaped based on a location of the projector and a size and shape of the upper surface to map to the upper surface.

20. The method of claim 15, wherein the display image comprises a static color image or an animated color image.

21. The method of claim 15, further including:
tracking a position of a tool relative to the exposed upper surface; and
generating the display image in response to the tracked position.

22. The method of claim 15, further including:
determining a topography of the upper surface; and
generating the display image to match the determined topography of the upper surface.

23. A method for creating an interactive display experience using a layer of granular display material, comprising:
sequentially projecting images from a set of guide images upon an upper surface of the granular display material;
projecting display images mapped to the guide images upon the upper surface of the granular display material;

tracking topography of the upper surface of the granular display material;
generating an image in response to the tracked topography; and
projecting the generated image onto the upper surface of the granular display material.

\* \* \* \* \*